United States Patent [19]
Tamura

[11] Patent Number: 6,096,402
[45] Date of Patent: Aug. 1, 2000

[54] ELONGATE COMPOSITE MEMBER HAVING A LONGITUDINALLY VARYING CROSS-SECTIONAL SHAPE, AS WELL AS METHOD OF, AND APPARATUS FOR MANUFACTURING THE SAME

[75] Inventor: Tatsuya Tamura, Yokohama, Japan

[73] Assignee: Hashimoto Forming Industry Co., Ltd., Kanagawa, Japan

[21] Appl. No.: 08/930,332

[22] PCT Filed: Jan. 30, 1997

[86] PCT No.: PCT/JP97/00223

§ 371 Date: Sep. 30, 1997

§ 102(e) Date: Sep. 30, 1997

[87] PCT Pub. No.: WO97/27989

PCT Pub. Date: Aug. 7, 1997

[30] Foreign Application Priority Data

Jan. 30, 1996 [JP] Japan .................................. 8-014569
Mar. 29, 1996 [JP] Japan .................................. 8-077919

[51] Int. Cl.[7] ........................................................ B32B 1/04
[52] U.S. Cl. ........................ 428/114; 52/716.5; 72/46; 72/181; 264/167; 264/171.11; 264/171.14; 264/252; 296/93; 296/135; 425/113; 425/465; 428/31; 428/122; 428/172
[58] Field of Search ............................ 428/31, 122, 172, 428/213, 114; 264/167, 171.11, 171.14, 171.16, 252; 425/113, 465; 72/181, 46; 296/135, 93; 52/716.5

[56] References Cited

U.S. PATENT DOCUMENTS 4,830,898  5/1989  Smith ....................................... 428/122
4,865,676  9/1989  Kimura et al. ...................... 156/244.12
5,804,118  9/1998  Yada et al. ............................... 264/167
5,837,297  11/1998  Yada et al. ............................... 425/381

FOREIGN PATENT DOCUMENTS 58-43261  9/1983  Japan .
63-28147  2/1988  Japan .
2-63217  3/1990  Japan .
5-201427  8/1993  Japan .

*Primary Examiner*—Nasser Ahmad
*Assistant Examiner*—Derek Jessen
*Attorney, Agent, or Firm*—Oliff & Berridge, PLC

[57] ABSTRACT

An elongate composite member suitable for a vehicle ornamental member comprises an elongate shaped body having a common cross-section part with a longitudinally constant cross-sectional shape, and a varying cross-section part with a longitudinally varying cross-sectional shape. A resin part is formed by extrusion molding along the varying cross-section part to continuously extend in the longitudinal direction, thereby realizing an excellent overall appearance. Such elongate composite members can be readily and continuously manufactured basically with an extrusion molding process, wherein the elongate shaped body is continuously and longitudinally fed into an extrusion die assembly comprising a stationary die and the movable die, through which the common cross-section part and the varying cross-section part are respectively passed in the longitudinal direction. The movable die is moved in a direction intersecting the passing direction of the elongate shaped body, in which the varying cross-section part varies during its passage in the longitudinal direction. At the same time, a resin is extruded from an extrusion orifice in the movable die, so that the elongate shaped body is formed with the resin part extending continuously in the longitudinal direction.

18 Claims, 14 Drawing Sheets

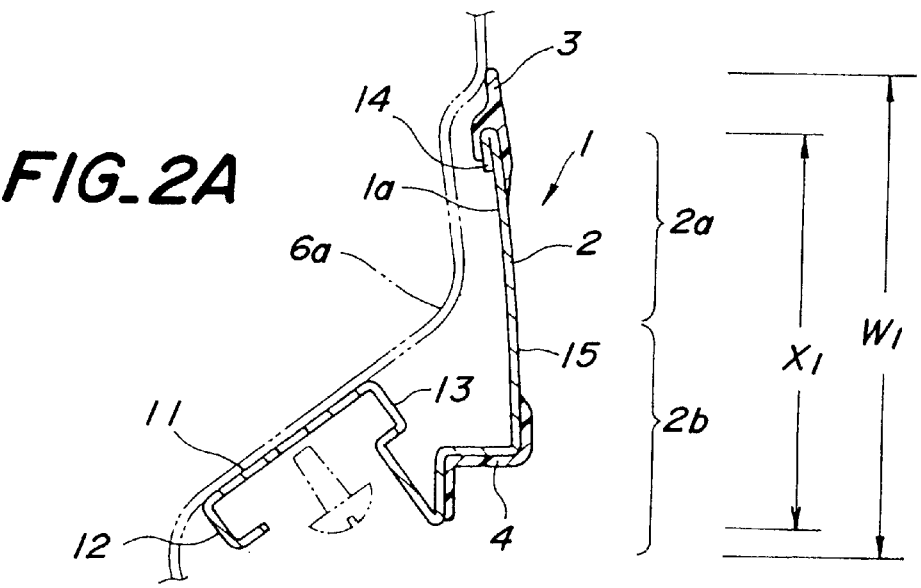
FIG_2A
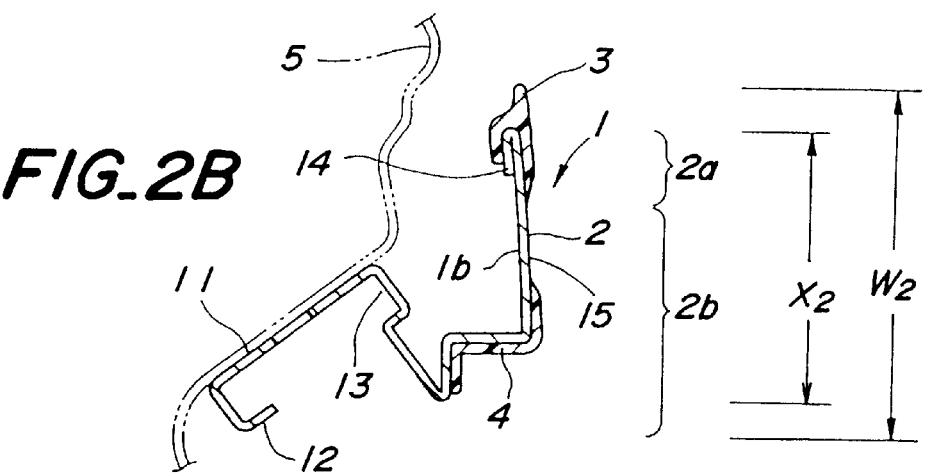
FIG_2B
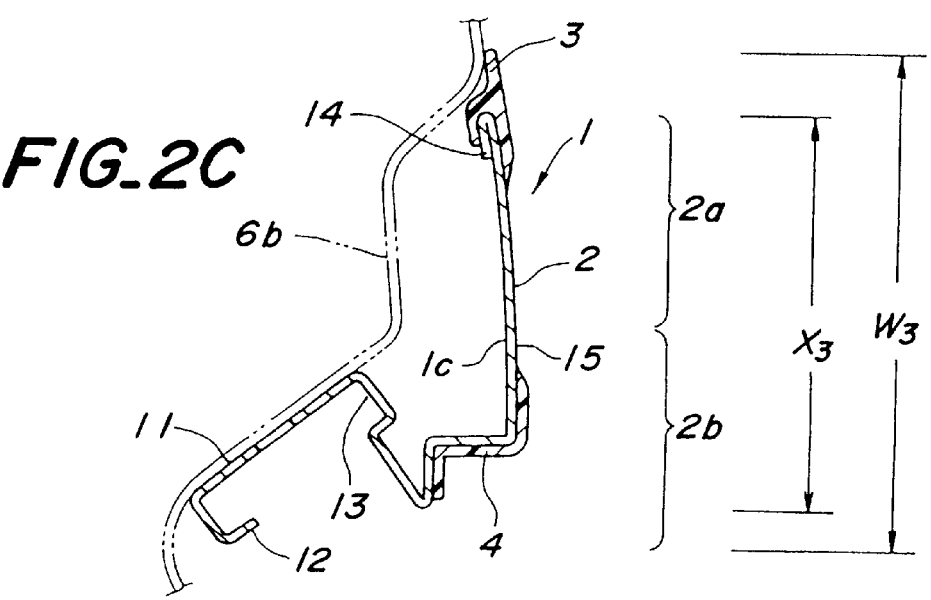
FIG_2C

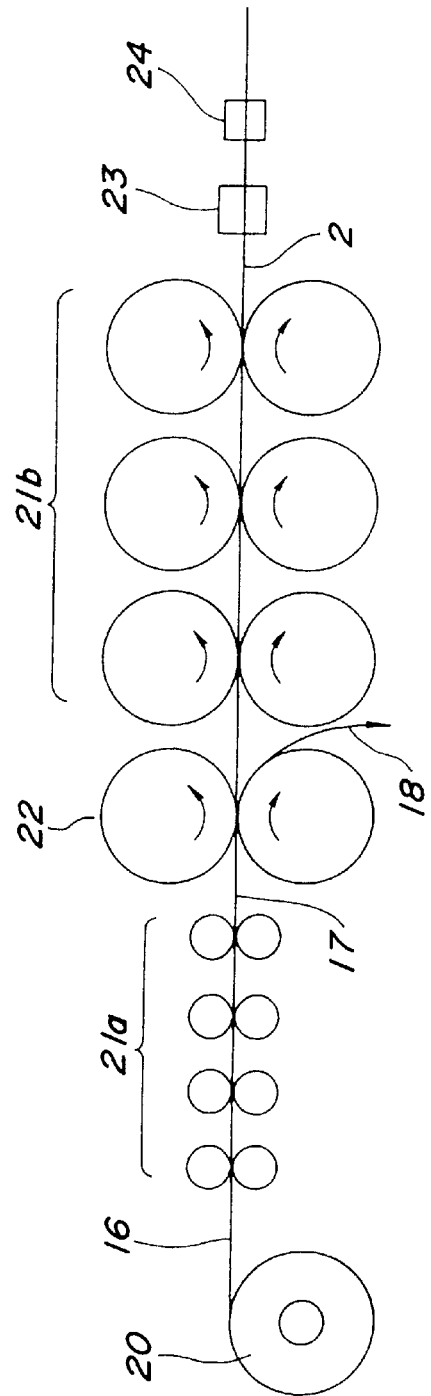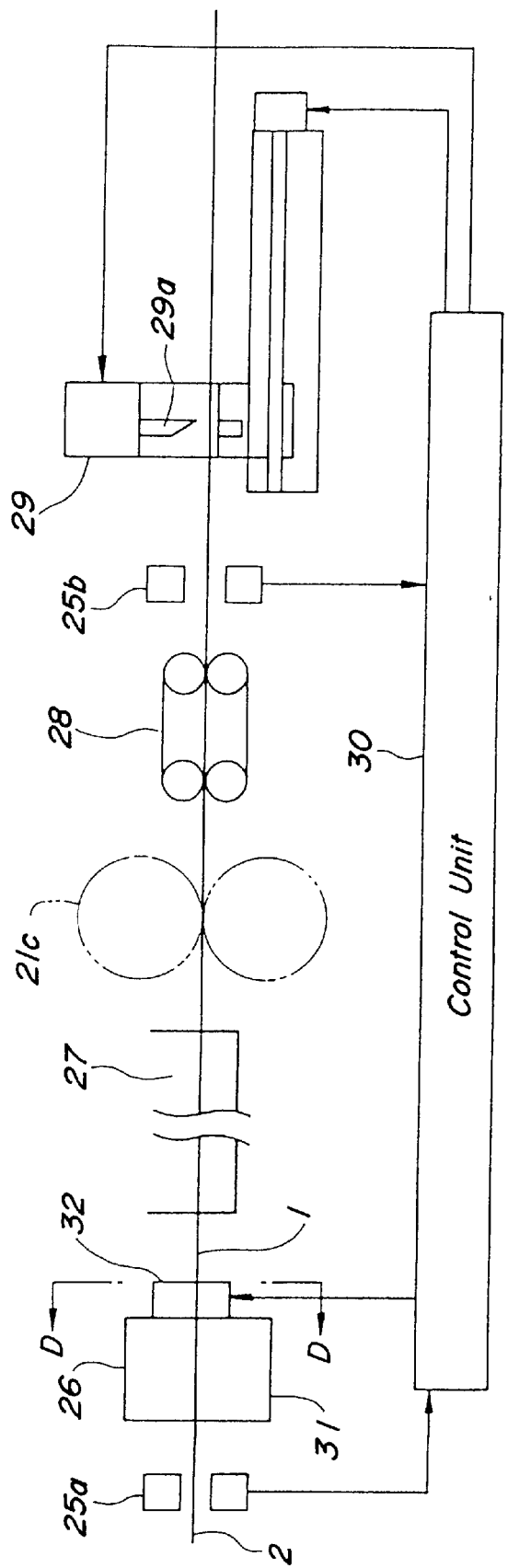
FIG. 3

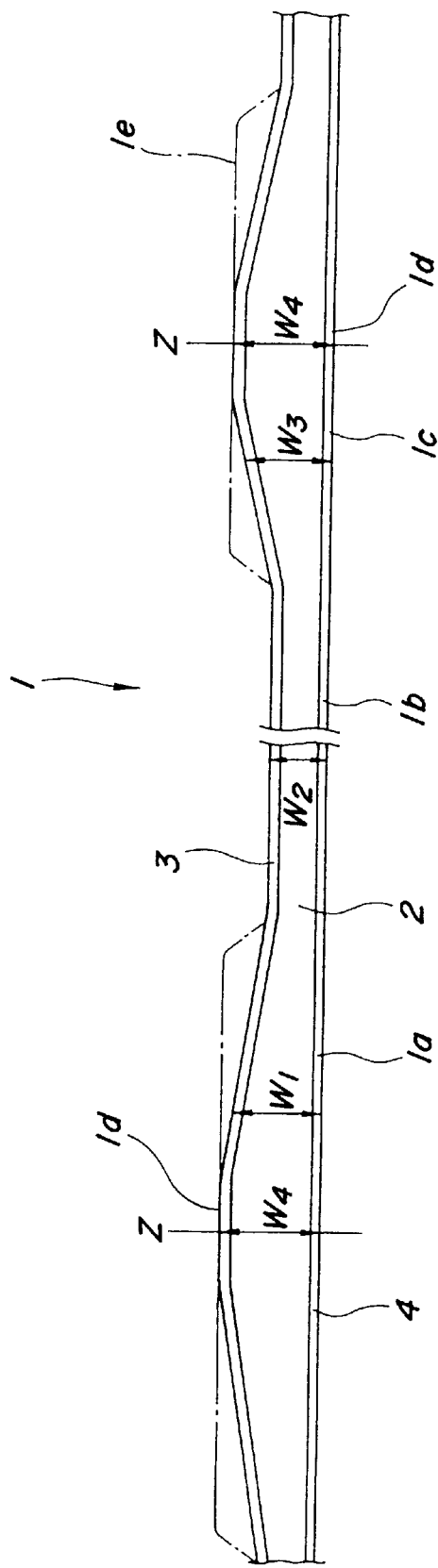

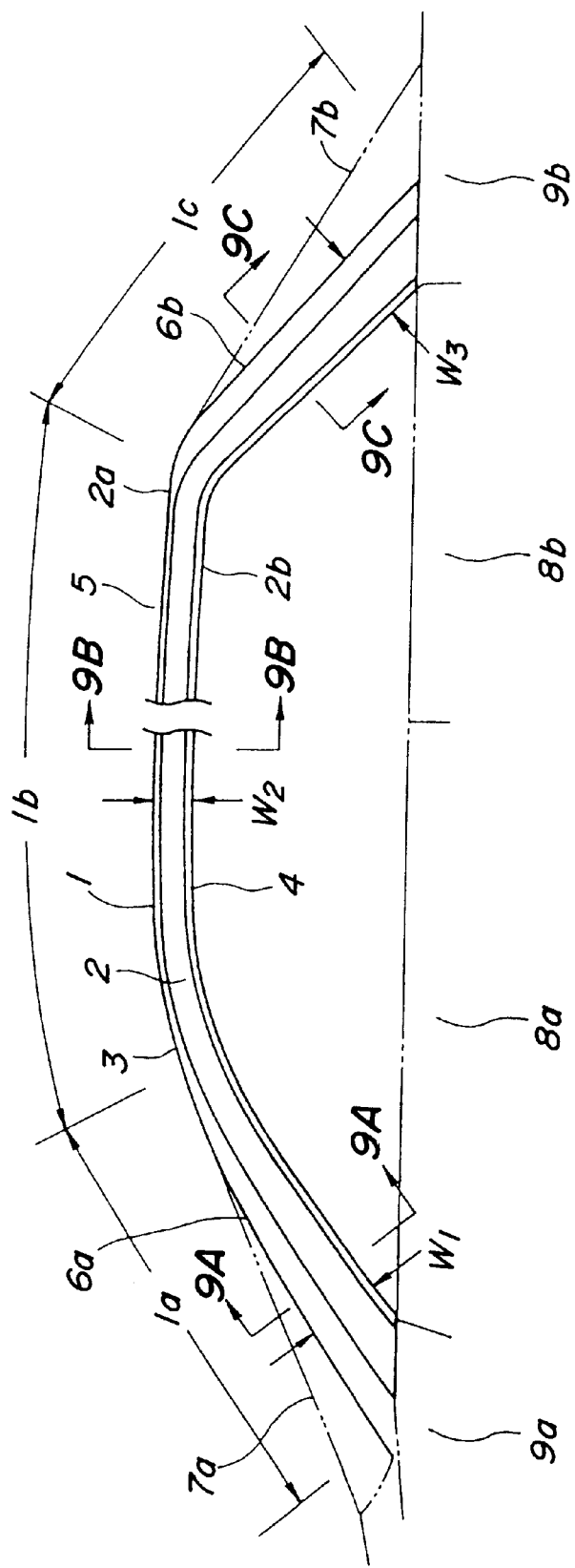

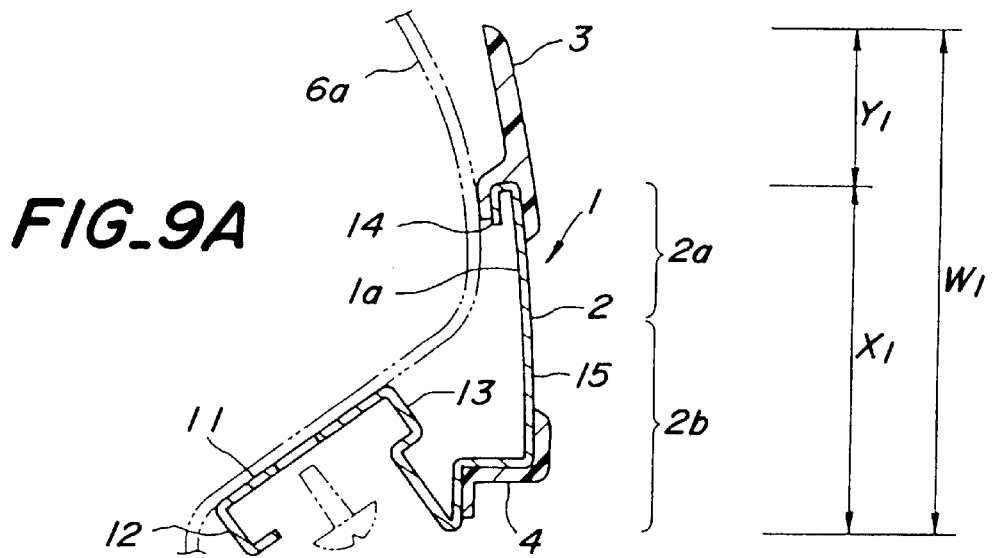
FIG_9A
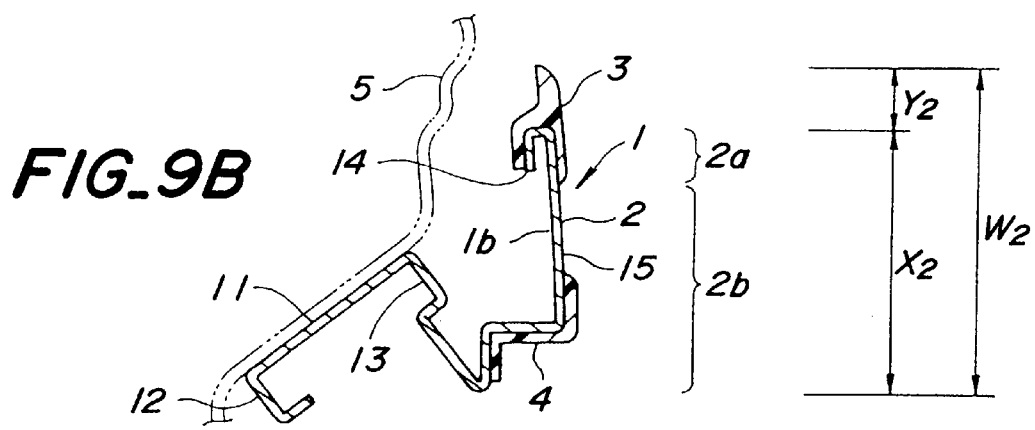
FIG_9B
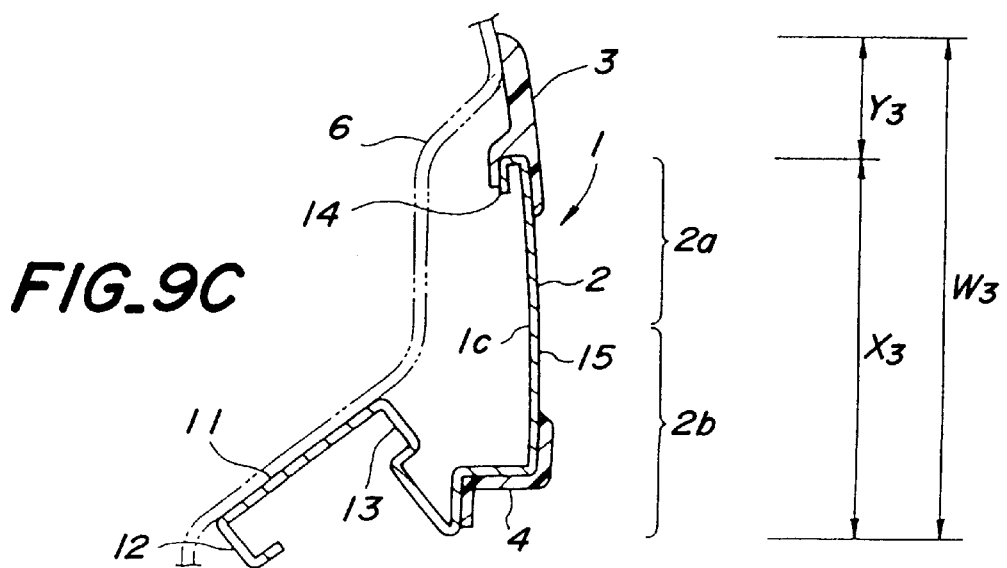
FIG_9C

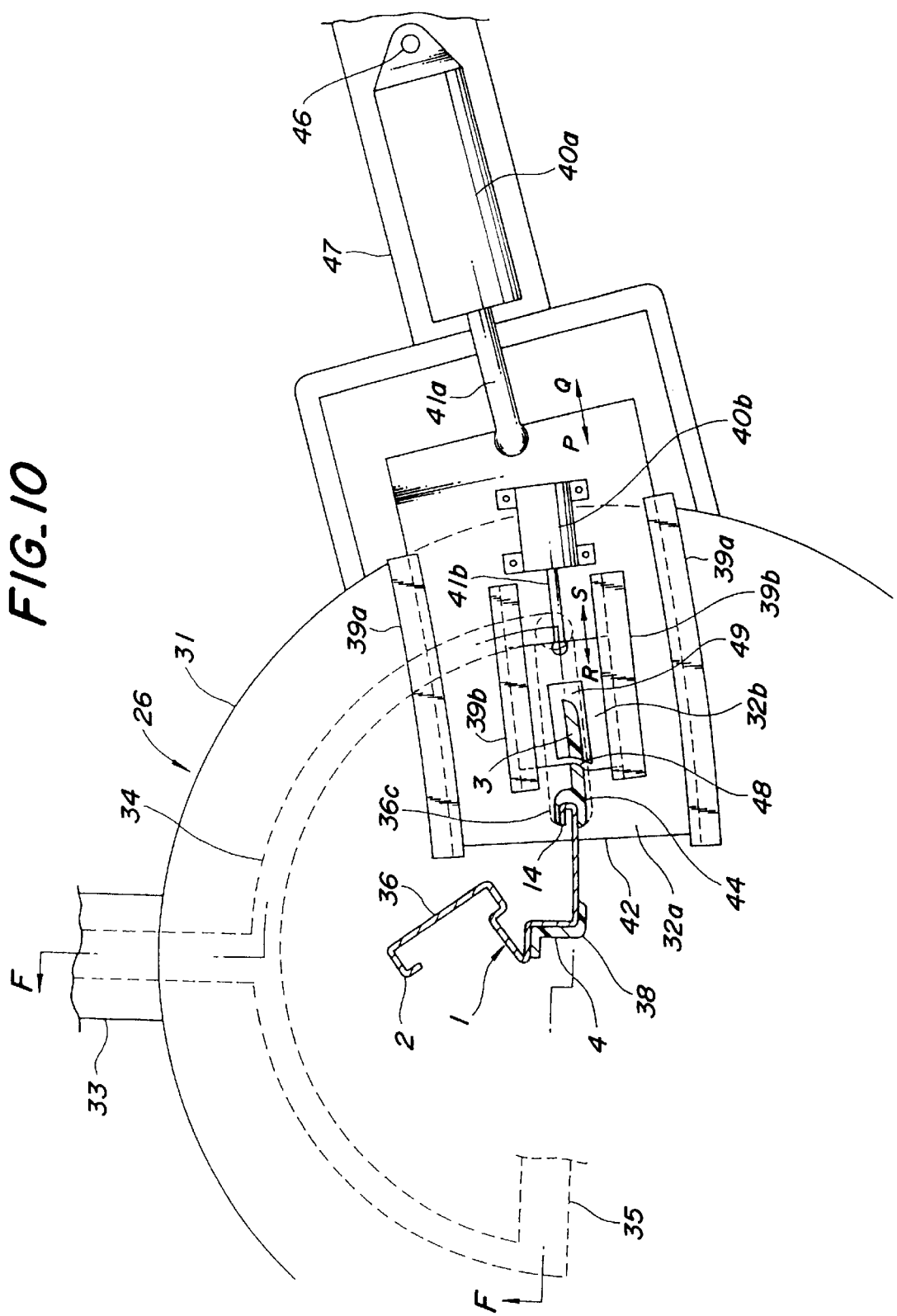

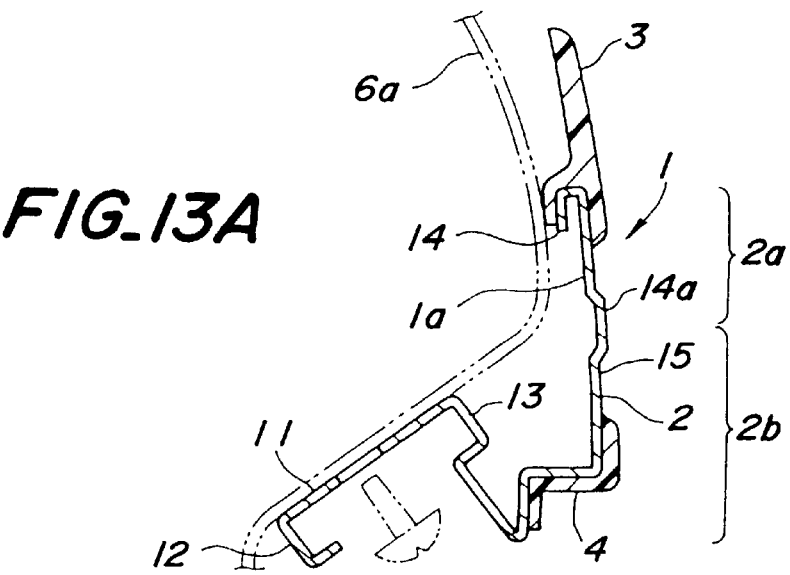
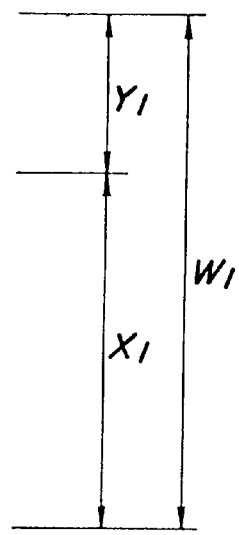
FIG._13A
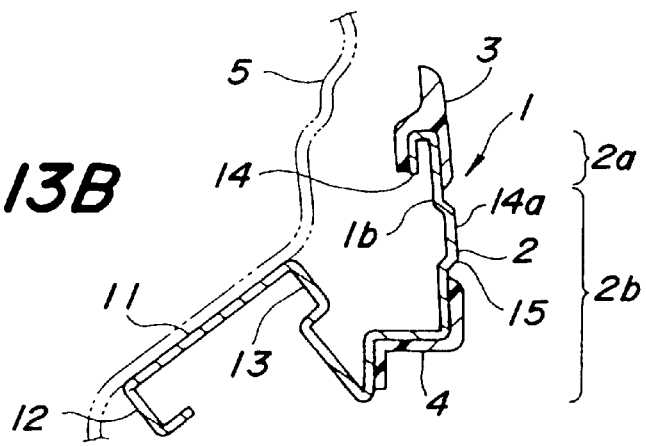
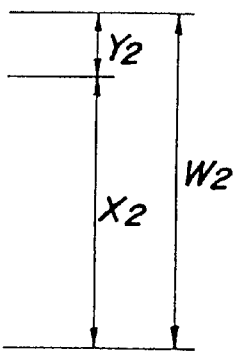
FIG._13B
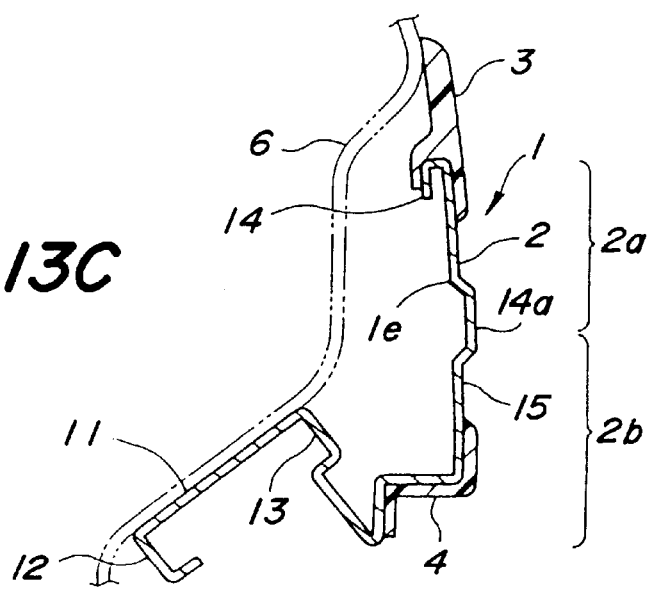
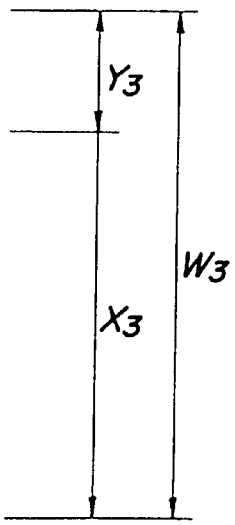
FIG._13C

ELONGATE COMPOSITE MEMBER HAVING A LONGITUDINALLY VARYING CROSS-SECTIONAL SHAPE, AS WELL AS METHOD OF, AND APPARATUS FOR MANUFACTURING THE SAME

TECHNICAL FIELD

The present invention relates to an elongate composite member having a cross-sectional shape which varies in its longitudinal direction, particularly an elongate composite molding which can be preferably used as a vehicle ornamental member, and also to a method of, and an apparatus for manufacturing the same.

BACKGROUND ART

Conventionally, there has been known an elongate composite member, such as a vehicle ornamental member, in which a resin part is continuously secured in the longitudinal direction to an elongate shaped body having a cross-sectional shape that varies in the longitudinal direction thereof. When used as a drip molding, the elongate composite member is comprised of a front portion extending along the front pillar panel of a vehicle body, a center portion along the roof panel and a rear portion along the rear pillar panel, which are connected into a unitary body with one another. Furthermore, it is a general practice that the center portion has a substantially constant cross-sectional shape while the front and rear portion have cross-sectional shapes which vary in the longitudinal direction thereof. That is, the center portion of the elongate composite member has a width which is constant in the longitudinal direction, though the front and rear portions have widths which gradually increase toward the front or rear end thereof from the width of the center portion. In this arrangement, it is preferable from the viewpoint of manufacturing technology, that the resin part has a cross-sectional shape which is substantially constant in its longitudinal direction, and the elongate shaped body has a cross-sectional shape which varies corresponding to the shape of the elongate composite member.

In order to manufacture an elongate composite member having a cross-sectional shape which varies in the longitudinal direction thereof, it has been customary to pre-form an elongate metal sheet into an elongate metal shaped-body and mold the resin part integrally with the shaped metal body by a so-called cast-injection molding process. Alternatively, the resin part which has been separately molded by an extrusion molding process is secured to the metal shaped body by an adhesive or the like. Such customary methods require large-sized press dies or injection mold. Accordingly, from a practical viewpoint, the integrally molded elongate composite member could not be made at once. The entire elongate composite member is thus divided into a plurality (typically, two or three) of pieces which are later joined with each other into a unitary body, with the result that the jointed lines are exposed to outside, thereby frequently degrading the appearance. Further, a manual work is indispensable in the case of fixing the resin part with an adhesive. In this instance, not only substantial man-hours are required, but also constant fixing can hardly be carried out, frequently causing the problem of degraded appearance. Accordingly, there has been a demand for an elongate composite member which is free from the above-mentioned problems.

SUMMARY OF THE INVENTION

The present invention has been achieved in view of the above-mentioned problems. It is a primary object of the present invention to provide an elongate composite member which can be simply and continuously manufactured by means of a simple facility and with a high productivity, and which is integrally formed in its entirety so as to exhibit an excellent appearance despite the cross-sectional shape of the elongate composite member which varies in the longitudinal direction thereof.

It is a subsidiary object of the present invention to provide a manufacturing technology which makes it possible to continuously manufacture an elongate composite member integrally formed in its entirety so as exhibit an excellent appearance, by a simple facility and with a high productivity, despite the cross-sectional shape of the elongate composite member which varies in the longitudinal direction thereof.

According to the present invention, there is provided an elongate composite member having a cross-sectional shape which varies in a longitudinal direction thereof, which comprises: an elongate shaped body having a common cross-section part with a cross-sectional shape which is substantially constant in the longitudinal direction, and a varying cross-section part with a cross-sectional shape which varies in the longitudinal direction; and a resin part extruded along said elongate shaped body and having a predetermined sectional shape, said resin part extending in the longitudinal direction corresponding to variation in the varying cross-section part of the elongate shaped body.

The elongate composite member according to the present invention has a structure wherein a resin part having a predetermined cross-sectional shape is formed by an extrusion molding along an elongate shaped body, and the resin part extends corresponding to variation of a varying cross-section part in the elongate shaped body. Accordingly, the elongate composite member can be continuously manufactured with a high productivity, by means of a simple facility despite its a cross-sectional shape which varies in the longitudinal direction thereof. The elongate composite member has an entirely integrated body and is capable of exhibiting an excellent appearance.

Preferably, the elongate shaped body in the elongate composite member according to the present invention is comprised of a profiled metal member which has been formed into a predetermined cross-sectional shape by bending a bright metal strip, such as stainless steel, through roll forming machine, etc., or of an extruded profiled body made of an aluminum alloy or the like. The material of the elongate shaped body is not be limited to a specific material, though soft or hard resin materials may be used therefor, other than metal material explained above.

The resin part in the elongate composite member according to the present invention is made of a resin material which can be extrusion molded, such as synthetic resin, elastomer resin or rubber (which collectively will be referred to as "resin"), having physical properties and color tone which are different from those of the elongate shaped body. The resin part has a cross-sectional shape which may be constant or may vary in the longitudinal direction thereof. The resin part which is molded at least in the varying cross-section part of the elongate shaped body, may also be molded in the common section part, and the molding positions of the resin parts and the number thereof can be suitably selected as desired.

Specifically, in the elongate composite member according to the present invention wherein the cross-sectional shape of the resin part in the varying cross-section part varies in the longitudinal direction thereof, the cross-sectional shapes of the varying cross-section part of the elongate shaped body and the resin part are both changed, so that even though the variation in the cross-sectional shape of one of them is small, a large variation can be obtained as a whole, thereby making it possible readily to realize highly decorative elongate composite member.

As mentioned above, as a manufacturing technology for an elongate composite member having the above-mentioned structure, the method according to the present invention comprises the step of continuously feeding an elongate shaped body having a common cross-section part with a cross-sectional shape which is substantially constant in the longitudinal direction, and a varying cross-section part with a cross-sectional shape which varies in the longitudinal direction, in its longitudinal direction into an extrusion die assembly comprising a stationary die and a movable die which is movable relative to the stationary die, so that the elongate shaped body is longitudinally passed through the extrusion die assembly, with the stationary die and the movable die corresponding to the common cross-section part and the varying cross-section part of the elongate shaped body, respectively. According to the present invention, the resin is extruded from an extrusion orifice formed in the movable die while moving the first movable die in a direction intersecting a passing direction of the elongate shaped body, in association with the longitudinal passing of the varying cross-section part of the elongate shaped body, so as to form a resin part in the varying cross-section part, which continuously extends in the longitudinal direction corresponding to variation of the varying cross-section part, thereby forming the elongate composite member.

Furthermore, for carrying out the above-mentioned method and manufacturing an elongate composite member having a cross-sectional shape which varies in the longitudinal direction thereof, the apparatus according to the present invention comprises an extrusion die assembly into which an elongate shaped body having a common cross-section part with a cross-sectional shape which varies in a longitudinal direction thereof, and a varying cross-section part with a cross-sectional shape which varies in the longitudinal direction, is continuously fed in the longitudinal direction so that the elongate shaped body is formed with a resin part which extends in the longitudinal direction. The extrusion die assembly comprises a stationary die allowing a passage of the common cross-section part of the elongate shaped body, and a movable die allowing a passage of the varying cross-section part of the elongate shaped body and having a resin extrusion orifice. The movable die is moved in a direction which intersects a passing direction of the varying cross-section part of the elongate shaped body and in which the varying cross-section part varies, in response to the passage of the elongate shaped body, while extruding a resin from said extrusion orifice so as to form the resin part along the varying cross-section part corresponding to variation thereof, thereby to manufacture the elongate composite member.

With the method and apparatus according to the present invention, as mentioned above, the resin part is formed in the varying cross-section part of the elongate shaped body by extrusion molding with the movable die which can be moved in a predetermined direction relative to the stationary die. Thus, the elongate composite member integrally formed as a whole so as to exhibit an excellent appearance can be continuously manufactured with a high productivity by means of a simple facility, despite the cross-sectional shape which varies in the longitudinal direction thereof.

In the above-mentioned apparatus, the resin extrusion orifice for forming the resin part in the varying cross-section part of the elongate shaped body is formed in the movable die as mentioned above. However, an additional resin extrusion orifice may be formed in the stationary die when an additional resin part is also formed in the common cross-section part of the elongate shaped body.

The extrusion die assembly is preferably be provided with a drive device for controlling the movement of the movable die in accordance with the movement of the elongate shaped body. In this case, the resin part can be precisely formed at a predetermined position, corresponding to the variation in the cross-section of the varying cross-section part.

When an elongate shaped body is used which has been obtained by rolling a metal strip, it is advantageous to provide a roll forming machine on the upstream side of the extrusion die assembly. With such a roll forming machine, an elongate shaped body having a required cross-sectional shape can be easily formed, and the elongate shaped body can be consistently and continuously processed through a step which is continuous to the extrusion molding. In other words, due to the combination of the roll forming machine and the extruder, the step of forming an elongate shaped body from a metal strip and the step of extrusion molding a resin part along the elongate shaped body, can be carried out continuously, thereby making it possible to significantly enhance the production efficiency based on the consistent manufacturing process.

Preferably, a slitter is provided in association with the roll forming machine when an elongate shaped body is used which has been formed by rolling a metal strip, so that the metal strip is subjected to continuous slitting in the longitudinal direction of the metal strip, by means of the slitter, and a widthwise part of the elongate shaped body is partly removed, such that the width of the metal strip is suitably changed in the longitudinal direction.

As for the elongate shaped body, a continuous raw material may be fed as it is. Alternatively, elongate shaped bodies which have been previously cut into a predetermined length, which is slightly larger than that of the final products, may be successively fed.

In the former case, for example, a metal strip is continuously paid out and fed and is subjected to a slitting step for changing the width thereof, a bending step for forming the predetermined cross-sectional shape, and the like so as to form the common cross-section shape and the varying cross-section shape. In this case, the elongate shaped body is previously formed to have cross-sectional shapes which approximate to those of the final product during the extrusion molding. The elongate shaped body is formed into final cross-sectional shapes, after the extrusion molding, by a bending step or the like, and is then cut into pieces having a predetermined length. When the continuous elongate shaped body is fed into the extrusion die assembly to form the resin part, and is then cut at predetermined positions, the process can be carried out continuously, thereby making it possible to improve the production efficiency.

In the latter case, when a profiled body made of metal or the like is used as the elongate shaped body, an extruded metal such as aluminum alloy or the like is cut into a length which is equal to or slightly larger than the length of the final product, and they are successively fed into the extrusion die assembly so as to be processed continuously.

In carrying out the present invention, the cross-sectional shape can be changed after the resin part has been formed at least along the varying cross-section part of the elongate shaped body. In this case, it is readily possible to manufacture elongate composite members having complicated cross-sectional shapes.

In the elongate composite member according to the present invention, the resin part formed in the varying cross-section part of the elongate shaped body, may have a cross-sectional shape which is constant in the longitudinal direction thereof or which varies in the longitudinal direction. In the latter case, a second movable die is preferably provided so as to movable relative to the first movable die, i.e., the above-mentioned movable die. The second movable die is moved relative to the first movable die when resin is extruded from the extrusion orifice in the first movable die, so as to change the extrusion shape of the resin extruded from the first movable die and thereby change the cross-sectional shape of the rein part.

BRIEF DESCRIPTION OF THE DRAWINGS

FIGS. 2A, 2B and 2C are cross-sectional views taken along line 2A—2A, line 2B—2B and line 2C—2C in FIG. 1, respectively;

FIG. 3 is a systematic view illustrating one example of apparatus for manufacturing the elongate composite member shown in FIG. 1;

FIG. 6 is a front view illustrating the elongate composite member shown in FIG. 1 before it is cut;

FIG. 8 is a front view illustrating a vehicle drip molding member according to another embodiment of the elongate composite member of the present invention;

FIGS. 9A, 9B and 9C are cross-sectional views taken along line 9A-9a, line 9B—9B and line 9C—9C in FIG. 8, respectively;

FIG. 10 is a cross-sectional view similar to FIG. 4, illustrating another example of the extrusion die assembly;

FIGS. 13A, 13B and 13C are cross-sectional views similar to FIGS. 9A, 9B and 9C, respectively, illustrating a variant form of the drip molding member shown in FIG. 8.

BEST MODE FOR CARRYING OUT THE INVENTION

Figure 1:
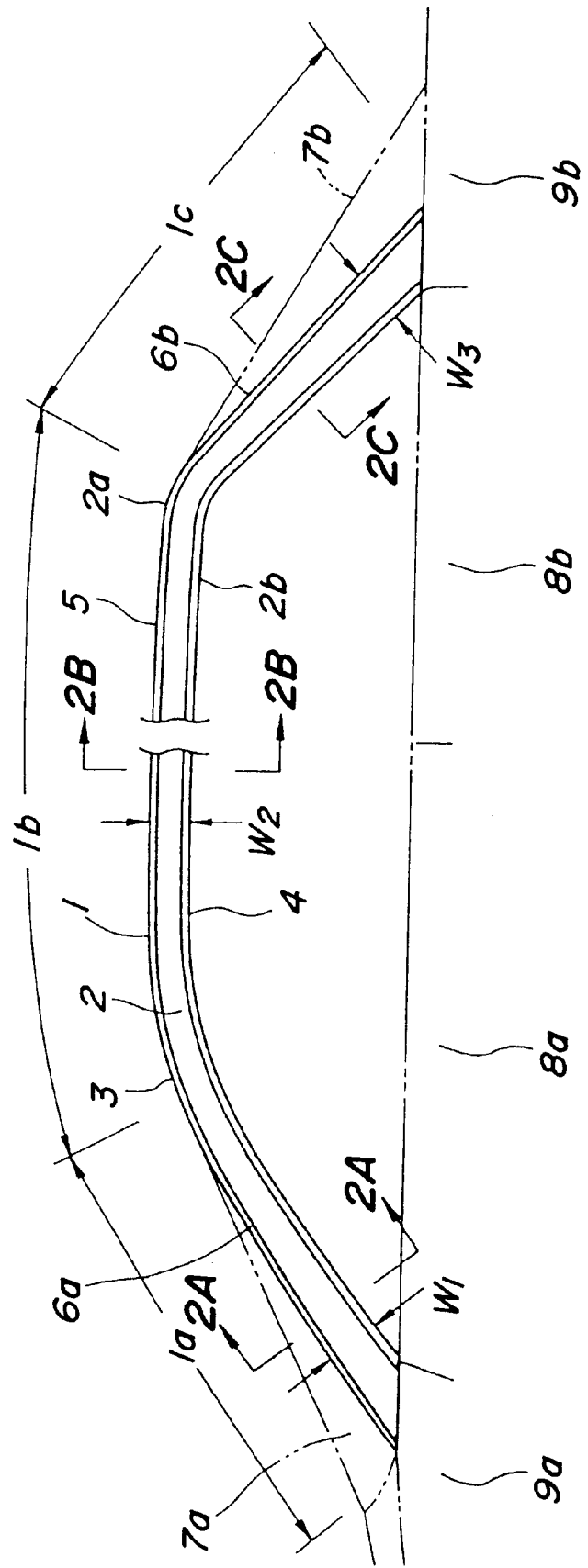
FIG. 1 is a front view illustrating a vehicle drip molding member as one embodiment of the elongate composite member according to the present invention.

The present invention will now be explained in further detail hereinafter, with reference to preferred embodiments shown in the accompanying drawings. It is to be noted that, throughout the figures, the same or like reference numerals are used to denote elements which correspond functionally to each other.

FIG. 1 is a front view illustrating an embodiment in which the elongate composite member is applied to a vehicle drip molding. In FIG. 1, reference numeral 1 denotes the elongate composite member as a whole, which is in the form of a drip molding. The elongate composite member 1 includes an elongate shaped body 2 which is comprised, on its opposite side edges, of a varying cross-section part 2a with a cross-sectional shape which varies in the longitudinal direction, and a common cross-section part 2b with a cross-sectional shape which is substantially constant in the longitudinal direction. Thus, the cross-sectional shape of the elongate shaped body 2 varies as a whole, in the longitudinal direction thereof. Furthermore, the varying cross-section part 2a and the common cross-section part 2b are respectively provided with resin parts 3, 4, which are continuously and longitudinally formed by extrusion molding.

Since the elongate composite member 1 is in the form of a vehicle drip molding, the composite member 1 is integrally formed with a front portion 1a extending along a front pillar panel 6a of a vehicle body, a center portion 1b extending along a roof panel 5, and a rear portion 1c extending along a rear pillar panel 6b. The center portion 1b is formed to have a substantially constant cross-sectional shape, and the front and rear portions 1a and 1c have varying cross-sectional shapes by gradually increasing the widths toward their front end and rear end, respectively. There are further shown, in FIG. 1, a front window 7a, a rear window 7b, a front door 8a, a rear door 8b, a front fender panel 9a and a rear fender panel 9b.

In FIG. 1, reference characters W1, W2 and W3 denote the widths of the front portion 1a, the center portion 1b and the rear portion 1c of the elongate composite member 1, respectively. The width W2 of the center portion 1b is substantially constant in the longitudinal direction. In contrast, the widths W1, W3 of the front portion 1a and the rear portion 1c are gradually increased toward their ends from the width W2, so that their cross-sectional shapes vary in the longitudinal direction. It is to be noted that, in the embodiment illustrated in FIG. 1, the cross-sectional shapes of the resin parts 3, 4 are constant in their longitudinal direction, and the cross-sectional shape of the elongate shaped body 2 substantially corresponds to the shape of the elongate composite member 1.

FIGS. 2A, 2B and 2C are cross-sectional views taken along lines 2A—2A, 2B—2B and 2C—2C in FIG. 1, respectively.

The elongate composite member 1 is comprised of the elongate shaped body 2 which has been formed by bending a metal strip, such as a bright stainless steel sheet, and the resin parts 3, 4 which are formed by extrusion molding longitudinally along the varying cross-section part 2a and the common cross-section part 2b. The resin parts 3, 4 are applied with a color which is different from that of the elongate shaped body 2. The elongate shaped body 2 has a shape such that the varying cross-section part 2a with a cross-sectional shape which varies in the longitudinal direction is projected with a varying projection length, from the common cross-section part with a cross-sectional shape which varies in the longitudinal direction. The resin parts 3, 4 are fixedly secured to the varying cross-section part 2a and the common cross-section part 2b, respectively. The common cross-section part 2b of the elongate shaped body 2 is subjected to bending and thereby formed with an attaching part 11 for attachment to the vehicle body panels (roof panel 5, front pillar panel 6a and rear pillar panel 6b), holding parts 12, 13 for a weather strip, and the like. A fold-back part 14 is formed in the varying cross-section part 2a. The resin part 3 is laid spaced from the roof panel 5 as shown in FIG. 2B, within the center portion 1b, so as to define a receiving groove for water drops or the like flowing down from the roof panel 5. Furthermore, in the front portion 1a and the rear portion 1c, as shown in FIGS. 2A and 2C, the resin part 3 is in contact with the front pillar panel 6a and the rear pillar panel 6b, forming an inside water channel.

On the vehicle exterior side of the elongate shaped body 2 between the resin parts 3, 4, in the vicinity of the boundary between the varying cross-section part 2a and the common cross-section part 2b, the metal steel sheet is exposed to the outside so as to form a bright part 15. In this case, the colored resin parts 3, 4 and the bright part 15 constitute an ornamental part which is visually observed from outside.

It is to be noted that the boundary between the varying cross-section part 2a and the common cross-section part 2b cannot always be definitely determined. Nevertheless, it may be considered that holding parts 12, 13 are included in the common cross-section part 2b, while the other parts are included in the varying cross-section part 2a. That is to say, the varying section part 2a is not necessarily limited only to an absolutely varying part, but may also include a portion of the common cross-section part. It may also be considered that, in the section shown in FIG. 2B, the parts other than the fold-back part 14 are included in the common cross-section part 2b, and extensions which extend from that section as shown in FIGS. 2A and 2C are included in the varying cross-section part 2a.

Reference characters X1, X2 and X3 denote the widths of the ornament parts in the front portion 1a, the center portion 1b and the rear portion 1c of the elongate shaped body 2, respectively. The width X2 in the center portion 1b is substantially constant, and the width X1 in the front portion 1a and the width X3 in the rear portion 1c are gradually increased from the width W2, toward the front end and the rear end, respectively. These enlarged parts are just parts in which the varying cross-section part 2a of the elongate shaped body 2 varies. On the contrary, each of the resin parts 3, 4 has substantially same width and cross-sectional shape over its entire length. Accordingly, the width of the bright part 15, as well as the entire width (W1 to W3) and cross-sectional shapes of the elongate composite member 1 substantially correspond to variations in the widths (X1 to X3) and cross-sectional shape of the elongate shaped body 2.

Figure 4:
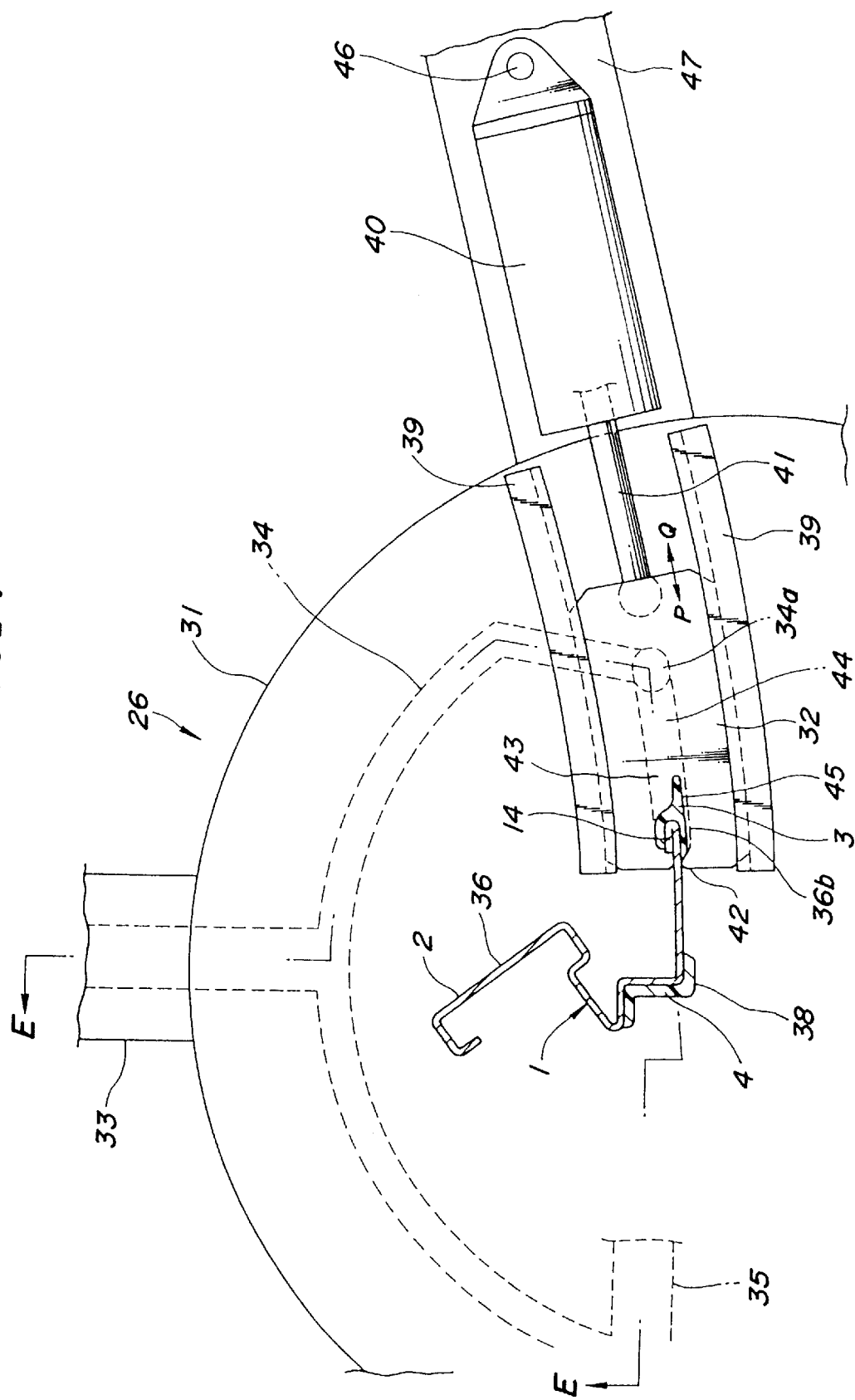
FIG. 4 is a cross-sectional view taken along line D—D in FIG. 3, illustrating one example of extrusion die assembly.
Figure 5:
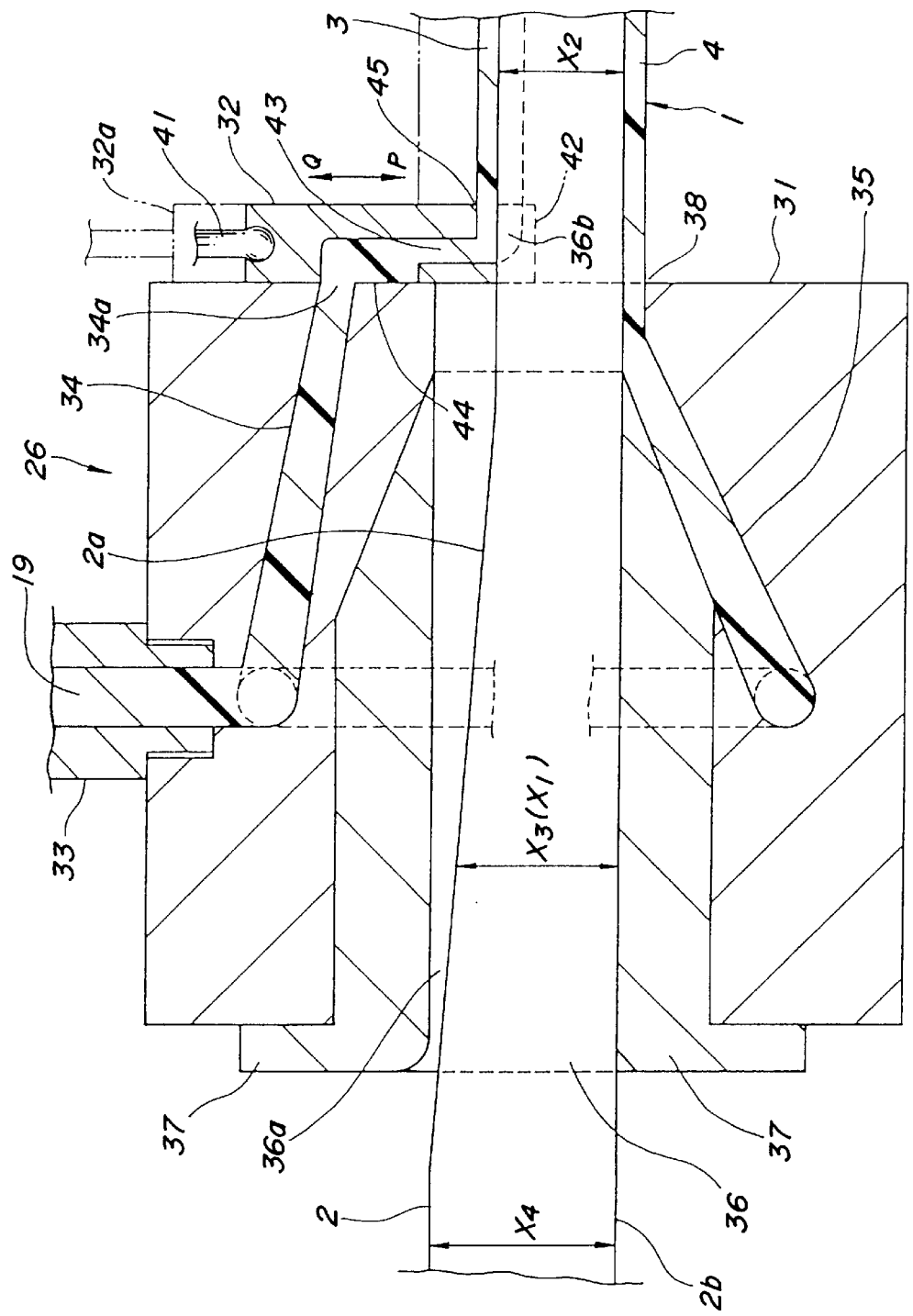
FIG. 5 is a longitudinal sectional view taken along line E—E in FIG. 4.

FIG. 3 is a systematic view illustrating one example of an apparatus for manufacturing the elongate composite member 1 shown in FIG. 1; FIG. 4 is a cross-sectional view taken along line D—D in FIG. 3; FIG. 5 is a longitudinal sectional view taken along line E—E in FIG. 4; and FIG. 6 is a front view illustrating the elongate composite member before it is cut.

Referring to FIG. 3, there are shown an uncoiler 20, roll forming machines 21a, 21b, 21c, a slitter 22, a coating device 23, a baking device 24, detecting devices 25a, 25b, extrusion die assembly 26 provided at the rear end of an extruder (not shown), a cooling device 27, a hauling device 28, a cutting device 29 and a control unit 30.

The extrusion die assembly 26 includes a stationary die 31, a movable die 32 and a resin supply passage 33 connected to the rear end of the extruder, as shown in FIGS. 4 and 5. The stationary die 31 is formed therein with resin flow passages 34, 35, and is provided with a holding member 37 having two passages 36, 36a for the elongate shaped body 2. The passages 36, 36a in the holding member 37 have their cross-sectional shapes substantially corresponding to the cross-sectional shape of the elongate shaped body 2 so as to allow the elongate shaped body 2 to pass therethrough. Thus, the passage 36 corresponds to the common cross-section part 2b, and the passage 36a corresponds to the varying cross-section part 2a. A resin flow passage 34 is communicated with the movable die 32, and a resin flow passage 35 has an extrusion orifice 38 at a position where the resin part 4 is to be formed in the common cross-section part 2b of the elongate shaped body 2.

The movable die 32 is guided by arcuate guide members 39, 39 and slidable relative to the stationary die 31, so as to be moved by a drive device 40 through a rod 41, back and forth in a direction orthogonal to the passing direction of the elongate shaped body 2. The movable die 32 is formed therein with the passage 36b through which the fold-back part 14 of the varying cross-section part 14 can be passed. The movable die 32 is further formed at its front end with a holding part 42 adapted to be engaged with the adjacent part of the fold-back part 14 so as to hold the latter.

The movable die 32 is formed therein with a resin flow passage 43. One end of the resin flow passage 43 is formed therein with an elongated hole-like communication port 44 which is connected to the resin flow passage 34 at a position corresponding to a fixed orifice 34a, so as to receive resin discharged from the fixed orifice 34a. The other end of the resin flow passage 43 is formed therein with an extrusion orifice 45 for the resin part 3, which is opened surrounding the passage 36b. A motor is used as the drive device 40, which is rotatably attached to a support table 47 by means of a pin 46. A motor incorporating a mechanism for converting the rotation into a linear motion, such as an AC servo-motor, a stepping motor or the like, is preferably used as the drive device 40 in view of convenience for control or accuracy, though a hydraulic cylinder may be alternatively used.

In the method of manufacturing the elongate shaped body with the above-mentioned apparatus, as disclosed, for example, in Japanese Patent Unexamined Publication No. 7-89,353, a metal strip 16 is fed out from the uncoiler 20. The metal strip 16 is then bent by an ordinary roll-forming machine 21a to form an intermediate material 17 with a constant cross-section, including a cross-section part which corresponds to the common cross-section part 2b. The intermediate material 17 is partly subjected to slitting by a roll type slitter 22, having a peripheral length which is substantially equal to the length of the finished elongate shaped body 2, as well as slitting blades which are formed on its outer periphery. The intermediate material 17 subjected to slitting has a width which varies in the longitudinal direction, thereby forming the varying cross-section part 2a. Extra material 18 removed by the slitting can be discharged and collected as it is. The remaining intermediate material 17 is further bent by a roll type roll-forming machine 21b which is comprised of a roll having a peripheral length which is substantially equal to the length of the finished elongate shaped body 2, and a shape forming surface of a predetermined shape on its outer periphery. This bending is carried out so that the fold-back part 14 is formed into such a shape that it comes toward and away from the common cross-section part. By this, an elongate shaped body 2 is formed, which has the varying cross-section part 2a and the common cross-section part 2b, as shown, for example, in FIGS. 2A to 2C.

Instead of the roll type slitter 22 having a peripheral length substantially equal to the finished elongate shaped body 2, and the roll type roll-forming machine 22, as in the above-mentioned method, the slitting may be performed by a heat energy conversion type cutting process, such as a laser beam cutting process. As regards the formation of the varying cross-section part 2a, in order to deal with the intermediate material 17 subjected to slitting into a width which varies according to the longitudinal movement of the intermediate material 17, the movement of the forming roll in the widthwise direction may be controlled to form the varying cross-section part 2a. Such a roll-forming process, per se, is disclosed in Japanese Patent Unexamined Publication No. 6-328,147, for example.

The elongate shaped body is coated over zones where the resin parts 3, 4 are formed, with an adhesive by the coating device 23, and the adhesive is then activated by the baking device 23. Instead of the coating device 24 and the baking device 24, there may be used another securing means such as a drilling device or the like for forming holes and fixedly connecting the resin parts with each other. Subsequently, the elongate shaped body 2 is fed into the extrusion die assembly 26, preferably at a constant speed, and is then subjected to an extrusion molding. Meanwhile, the position and the feeding amount of the elongate shaped body 2 fed to the extrusion die assembly 26 are detected by the detecting device 25a. The detection is suitably carried out by a position sensor, which serves to detect the varying position in the varying cross-section part 2. The detection signal from the detecting device 25a is transmitted to the control unit 30.

In the extrusion die assembly 26, the drive device 40 is operated in response to a drive signal from the control unit 30 in accordance with the detection signal from the detecting device 25a, so as to move the movable die 32 back and forth. On this occasion, the detecting device 25a detects the variation degree and the feeding amount of the varying cross-sectional part 2a. The control unit 30 computes the time by which the relevant point of the varying cross-section part 2a reaches the position of the movable die 32, based on the distance between the detecting device 25a and the movable die 32, and also on the feed speed. According to the computed time, the control unit 30 delivers a drive signal for controlling the timing and the forward and backward movement of the movable die 32.

When the elongate shaped body 2 has an adequate rigidity, such as a profiled metal member, the varying portion of the varying cross-section part 2a caused by passing of the elongate shaped body 2 can be used as a cam, with the movable die 32 as a cam follower, so as to achieve a cam action for moving the movable die back and forth. In this instance, the detecting device 25a and the driving device 40 can be eliminated.

The elongate shaped body 2 is fed so as to pass the common cross-section part 2b through the passage 36 formed in the holding member 37 of the extrusion die assembly 26, and to pass the varying part 2a through the passages 36a, 36b, while resin is fed from the resin supply passage 33 for carrying out the extrusion molding.

On such occasion, the resin 19 is branched into the resin flow passages 34, 35. The resin flowing through the resin flow passage 35 is extruded from the extrusion orifice 38 to form the resin part 4 in the common cross-section part 2b of the elongate shaped body 2, which continuously extends in the longitudinal direction. Meanwhile, the resin flowing through the resin flow passage 34 is fed through the orifice 34a in the stationary die 34a, and is received into the communication port 44 from which the resin flows through a resin flow-out passage 43 in the movable die 32. Then, the resin is extruded from the extrusion orifice 45 so as to form the resin part 3 in the varying cross-section part 3 of the elongate shaped body 2. As a result, there is formed the elongate composite member 1 shown in FIG. 6. At this time, the common cross-section part 2b of the elongate shaped body 2 passes through the passage 36 of the stationary die 31. Thus, the elongate shaped body 2 is prevented from moving in a direction intersecting the advancing direction thereof, and in a rotating direction about the longitudinal axis of the elongate shaped body 2, so that the elongate shaped body 2 is positioned. Therefore, the common cross-section part is advanced in the extrusion die assembly 26 while always maintaining the same position and posture. In this case, while the widths X1 to X4 vary in association with the advancement of the elongate shaped body 2, the movable die 32 is moved back and forth in the directions of arrows P, Q in response to such variations. Thus, the fold-back part 14 formed at the tip end of the varying cross-section part 2a always passes through the passage 36b in the movable die 32.

By this, the resin part 3 is always formed at the tip end of the varying cross-section part 2a and an elongate composite member 1 having a cross-sectional shape which varies in the longitudinal direction is manufactured.

As shown in FIG. 5, during the period when a part of the elongate shaped body 2 having the minimum width X2 passes through the movable die 32, the movable die 32 is advanced to the position indicated by the solid line, so as to form the center portion 1b. In a part where the elongate shaped body 2 is further advanced and the width X3 or X1 is increased, the movable die 32 is retracted to form the rear portion 1c or the front portion 1a. When the width of the elongate shaped body 2 becomes the maximum width X4, the movable die 32 is retracted to a position indicated by the dotted line 32a. At this position, the extrusion molding is carried out for a while, so as to form a gripping marginal part 1d required for a subsequent axial bending step. When the width of the elongate shaped body 2 is subsequently decreased to X1 or X3, the movable die 32 is advanced to form the front portion 1a or the rear portion 1c.

Referring to FIG. 4, the varying cross-section part 2a of the elongate shaped body 2 as it is passed varies in an arcuate manner. The movable die 32 is thus guided by the guide member 39 and moved along the arcuate path corresponding to this variation, and the drive device 40 is rotated about a pin 46 in response to such movement. When, however, the varying cross-section part 2a varies in a linear manner, the movable die 32 is linearly moved so that the drive device 40 may be fixedly arranged.

The elongate composite member 1 formed as explained above is cooled by the cooling device 27 so as to solidify the resin parts 3, 4, before it is hauled by the hauling device 28. During this process, a post forming may be carried out by the roll-forming machine 21c as required, so as to further change the cross-sectional shape. In the case of the formation by the roll-forming machine 21c, the roll-forming machines 21a, 21b may partly be eliminated. The embodiment which uses such a roll-forming machine 21c is particularly preferable for a case when a convex shaped part 14a is formed in the varying cross-section part 2a, as will be explained hereinafter with reference to FIGS. 7a to 7c.

Subsequently, similar to the case of the detecting device 25a, the position of the elongate composite member 1 is detected by the detecting device 25b. Accordingly, the cutting device 29 is driven in response to a drive signal which has been obtained by the computation in the control unit 30 based on the detection signal from the detecting device 25b, so that the elongate composite member 1 is cut at the front end position of the front portion 1a (i.e., at the rear end of the rear portion 1c) into a predetermined length.

The cutting device 29 is arranged so that the cutting blade 29a carries out cutting while it is moved at the same speed as that of the elongate composite member 1. Accordingly, the drive signal is transmitted in order to carry out cutting at a predetermined cutting position Z, in accordance with the distance between the detecting device 25a and the cutting blade 29a. The cutting position Z is set at a substantially center position of the gripping marginal part 1d in the maximum width part W4 of the elongate composite member 1, as shown in FIG. 6.

The gripping marginal parts 1d in the maximum width part W4 (corresponding to X4 in FIG. 5) formed at the opposite ends of the elongate composite member 1, which has been cut into the predetermined length, are clamped. The elongate composite member 1 is then subjected to an axial bending by a stretch bending device or the like, so as to have a small radius of curvature equal to the radius of curvature of the vehicle body part around each of the boundaries between the front and rear portions 1a, 1c and the center portion b. Thereafter, the gripping marginal parts 1d are cut off so as to obtain the elongate composite member shown in FIG. 1. It is to be noted that no gripping marginal parts are required when the axial bending is carried out by a press-type or CNC (computer numerical control) bending device is used. In such instance, the slitting process and the extrusion molding process are adapted for a shape without gripping marginal parts.

The above-mentioned manufacturing method has been explained with reference to the embodiment wherein the elongate shaped body 2 is formed by bending of the bright metal strip 16 comprised of a stainless steel sheet or the like. However, when an extruded aluminum alloy material cut into a predetermined length is used, the roll-forming machines 21a to 21c can be eliminated and, instead thereof, a push-in feed device for the extruded material is arranged. Furthermore, an extruded hard resin material is used as the elongate shaped body 2, an additional resin extruder is arranged on the upstream side of the extrusion die assembly.

Moreover, from the design and styling viewpoint, the elongate composite member 1 may be of such a shape wherein, as shown by dotted lines in FIG. 6, the front and rear portions 1a, 1c have constant widths, respectively, so that the shape varies with relative steep continuous curves in the vicinity of the boundaries between the front and rear portions 1a, 1c and the center portion 1b, or of other desired shapes.

Figure 7A:
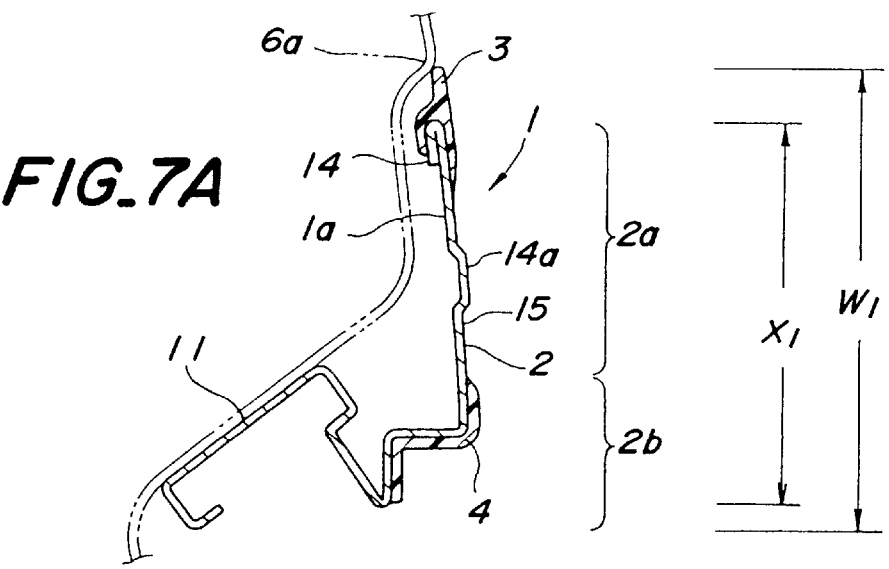
FIGS. 7A, 7B and 7C are cross-sectional views similar to FIGS. 2A, 2C and 2D, respectively, illustrating a variant form of the drip molding member shown in FIG. 1.
Figure 7B:
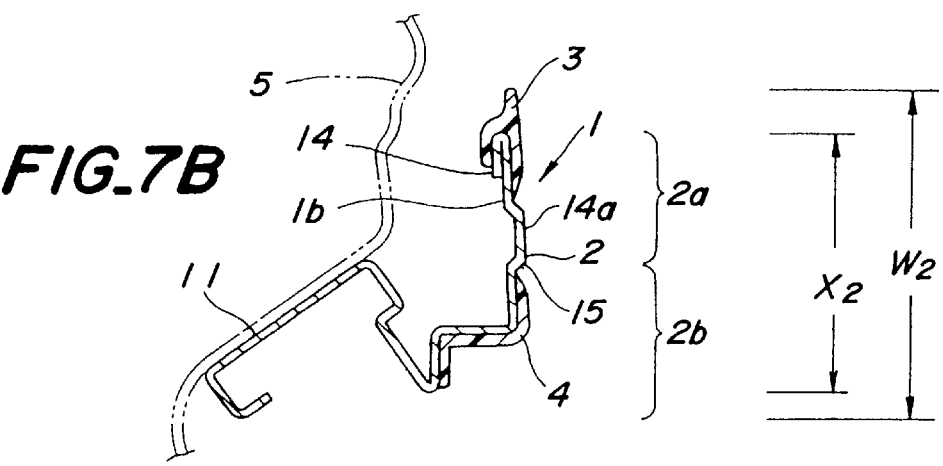
Figure 7C:
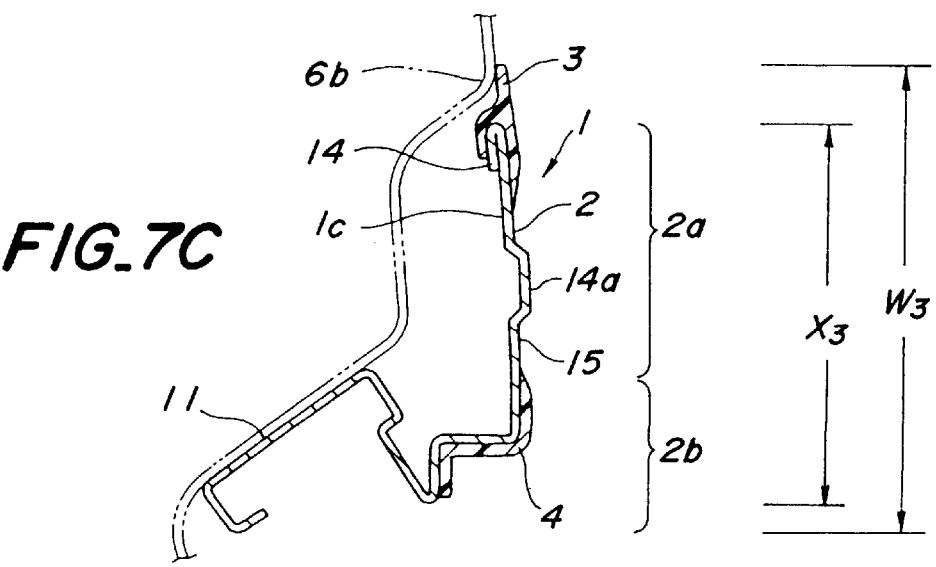

FIGS. 7A, 7B and 7C are cross-sectional views similar to FIGS. 2A, 2B and 2C, illustrating a variant form of the elongate composite member 1 shown in FIG. 1. The elongate composite member according to this variant form is also formed as a drip molding member, and is the same as the above-mentioned embodiment except that a convex shaped part 14a is formed in the bright part 15 in the varying cross-section part 2a so that the distance from the common cross-section part 2b varies in the longitudinal direction. Such a shaped part 14a may be formed with the roll forming machine 21c as mentioned above. Except the above-mentioned point, the elongate composite member 1 has basically the same structure as that of the above-mentioned embodiment, and can thus be easily manufactured by the facility shown in FIGS. 3 to 5.

FIG. 8 is a front view of a vehicle drip molding similar to that shown in FIG. 1, illustrating another embodiment of the elongate composite member according to the present invention. Furthermore, FIGS. 9A, 9B and 9C are cross-sectional views along line 9A—9A, line 9B—9B and line 9C—9C in FIG. 8, respectively. As clearly understood from these figures, in this embodiment, the cross-sectional shape of the resin part 3 secured to the varying cross-section part 2a of the elongate shaped body 2 varies in the longitudinal direction. Accordingly, this embodiment differs from the previous embodiment in that the attaching position thereof varies as the cross-sectional shape of the varying cross-section part is changed.

Reference characters X1, X2 and X3 denote the widths of the ornament parts in the front portion 1a, the center portion 1b and the front portion 1c of the elongate shaped body 2, respectively. The width X2 is substantially constant while the widths X1 and X3 are gradually increased toward their free ends from the width X2. These width-increased parts are directly formed into the varying cross-section part 2a of the elongate shaped body 2. Reference characters Y1, Y2 and Y3 denote the projecting widths of the resin part 3. The width Y2 is substantially constant, and the width Y1 is gradually increased from the width Y2 toward its free end, though the width Y3 is substantially constant and larger than the width Y2. The cross-sectional shape of the varying cross-section 2a is not always limited to the shape which continuously varies over its entire length, and it may be locally maintained in the same cross-sectional shape, as in the center portion 1b. On the contrary, the resin part 4 has substantially the same width and the same cross-sectional shape over the entire length thereof. Accordingly, the bright part 15 of the elongate composite member 1 and the entire widths and the cross-sectional shapes of the elongate composite member 1 are changed, substantially corresponding to variations in the widths (X1 to X3) of the elongate shaped body 2, and in the widths (Y1 to Y3) and the cross-sectional shape of the resin part 3.

Except the above-mentioned points, the elongate composite member 1 according to this embodiment has basically the same arrangement as the previous embodiment, including such an arrangement wherein the resin part 4 having a longitudinally constant cross-sectional shape is secured substantially at the same position, to and along the common cross-section part. The elongate composite member according to this embodiment can be easily manufactured basically with the facility shown in FIGS. 3 to 5. In this case, however, the facility (in particular, the extrusion die assembly) requires some modification in order to form the resin part having a longitudinally varying cross-sectional shape.

Figure 11:
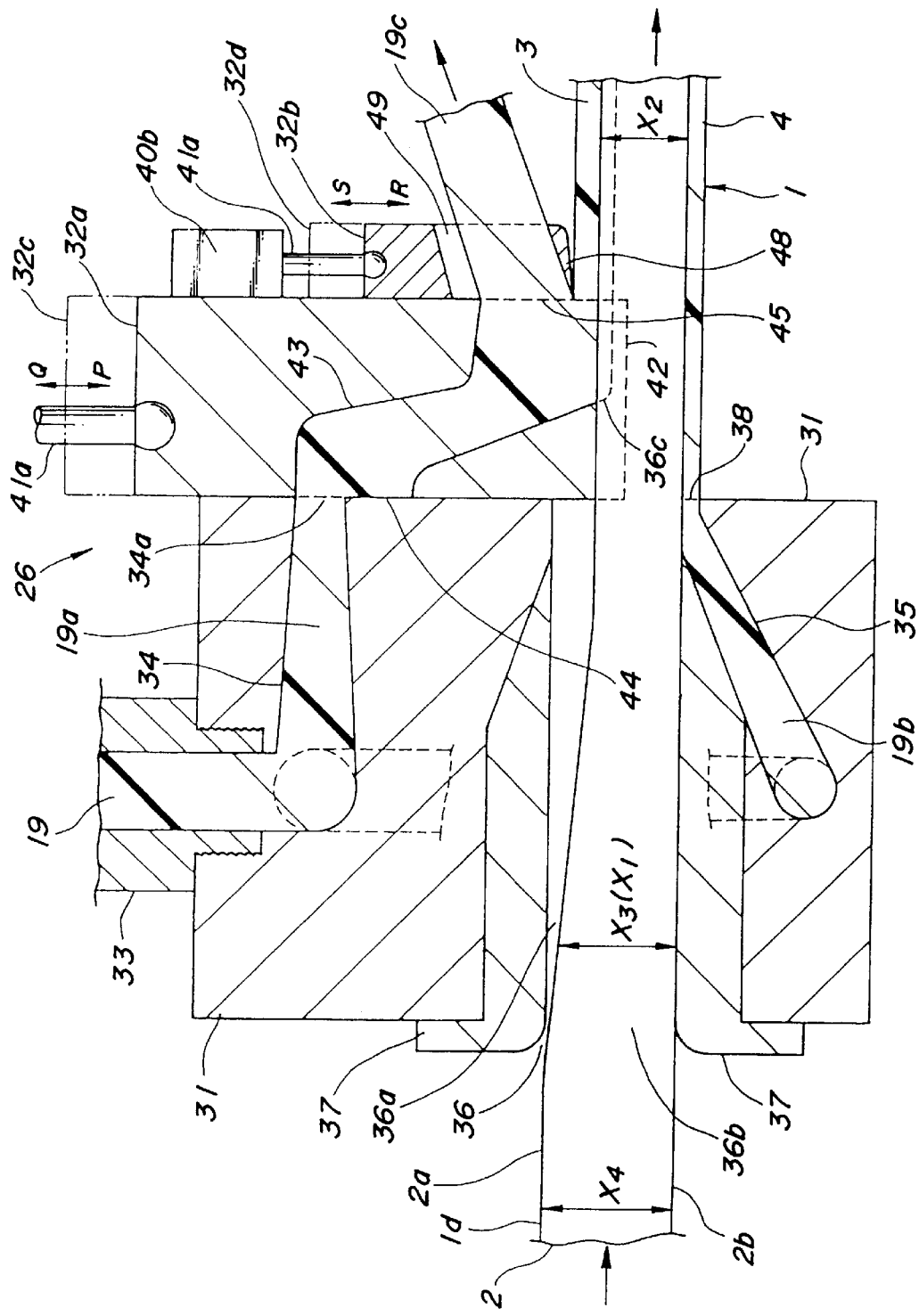
FIG. 11 is a longitudinal sectional view taken along line F—F in FIG. 10.
Figure 12:
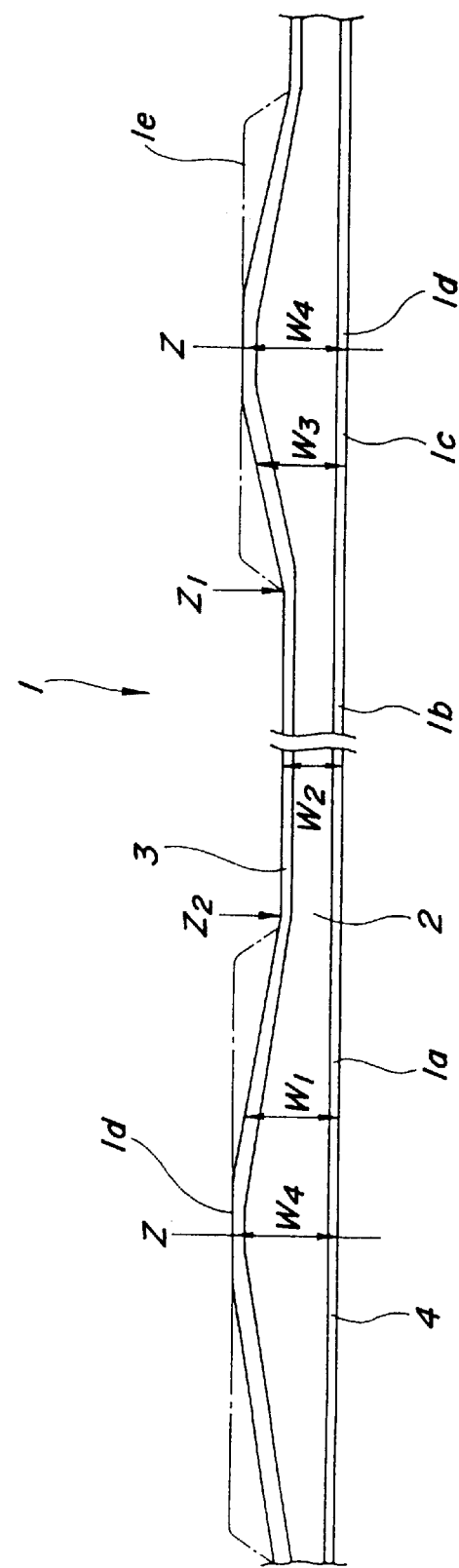
FIG. 12 is a front view illustrating the elongate composite member shown in FIG. 8, before it is cut.

FIG. 10 is a cross-sectional view similar to FIG. 4, illustrating an example of the extrusion die assembly which has been modified so as to be used for manufacturing the elongate composite member according to the embodiment shown in FIG. 8. Furthermore, FIG. 11 is a longitudinal sectional view taken along line F—F in FIG. 10, and FIG. 12 is a front view illustrating the elongate composite member shown in FIG. 8, before it is cut. As shown in FIGS. 10 to 11, the extrusion die assembly 26 includes a stationary die 31 and a first movable die 32a corresponding respectively to the stationary die 31 and the movable die 32 shown in FIGS. 3 to 5 in terms of the arrangement and function thereof. The extrusion die assembly 26 further includes a second movable die 32b which is movable relative to the first movable die 32a. Thus, explanation will be hereinafter made of the arrangements and operations of the components, mainly in the extrusion die assembly 26.

As shown in FIGS. 10 and 11, the extrusion die assembly 26 according to this embodiment comprises the stationary die 31, the first and second movable dies 32a, 32b, and a resin supply passage 33 connected to the rear end of the extruder. The stationary die 31 is formed therein with resin flow passages 34, 35, and is provided with a holding member 37 having a passage 36 for the material for the elongate shaped body 2. The passage 36 in the holding member 37 has a cross-sectional shape substantially corresponding to the cross-sectional shape of the elongate shaped body 2 so as to allow the elongate shaped body 2 to pass therethrough. The passage 36 is composed of a passage 36a for passing the varying cross-section part 2a therethrough, and a passage 36b for passing the common cross-section part 2b therethrough. The resin flow passage 34 is communicated with the first movable die 32a, and the resin flow passage 35 has an extrusion orifice 38 at a position where the resin part 4 is to be formed in the common cross-sectional part 2b of the elongate shaped body 2.

The first movable die 32a is guided by arcuate guide members 39a, 39a on the opposite sides thereof, and slidable relative to the stationary die 31 so as to be moved by a drive device 40a through a rod 41a, back and forth in a direction orthogonal to the passing direction of the elongate shaped body 2. The first movable die 32a is formed therein with the passage 36 through which the fold-back part 14 of the varying cross-section part 2a of the elongate shaped body 2 can be passed. The first movable die 32a is further formed at its front end with a holding part 42 adapted to be engaged with the adjacent part of the fold-back part 14 so as to hold the latter.

The first movable die 32a is formed therein with a resin flow passage 43. One end of the resin flow passage 43 is formed therein with an elongated hole-like communication port 44 which is connected to the resin passage 34 at a position corresponding to the fixed orifice 34a, so as to receive resin discharged from the fixed orifice 34a. The other end of the resin flow passage 43 is formed therein with an orifice 45 which is opened to the second movable die 32b. A motor is used as the drive device 40a, which is rotatably attached to a support table 47 by means of a pin 46.

The second movable die 32b is guided by guide members 38b, 39b provided on the first movable die 32a, and slidable relative to the first movable die 32a so as to be moved by a second drive device 40b through a rod 41b, back and forth in a direction orthogonal to the passing direction of the elongate shaped body 2. The second movable die 32b is provided at its front end with a cutter 48 for dividing the resin flow extruded from the orifice 45, and a resin discharge passage 49 is formed adjacent thereto. Like the first drive device 40a, a motor incorporating a mechanism for converting the rotation into a linear motion, such as an AC servomotor, a stepping motor or the like, is preferably used as the second drive device 40b in view of convenience for control or accuracy, though hydraulic cylinders may be alternatively used for these drive devices.

In the manner described with reference to FIGS. 3 to 5, a metal strip is fed out from the uncoiler. The metal strip 16 is then bent by an ordinary roll-forming machine so as to form an intermediate material with a constant cross-sectional shape, including a cross-section part which corresponds to the common cross-section part. The intermediate material is partly subjected to slitting by a roll type slitter, so that it has a width which varies in the longitudinal direction, thereby forming the varying cross-sectional part. Extra material removed by the slitting is discharged and collected as it is. The remaining intermediate material is further bent by a roll-forming machine which is comprised of a roll having a shape forming surface of a predetermined shape on its outer periphery. This bending is carried out so that the fold back part is formed into such a shape that it comes toward and away from the common cross-section part. By this, an elongate shaped body 2 is formed, which has the varying cross-section part 2a and the common cross-section shape 2b as shown, for example, in FIGS. 9A to 9C.

The elongate shaped body 2 obtained as above is coated with an adhesive which is then activated by the baking device. Subsequently, the elongate shaped body 2 is fed into the extrusion die assembly 26, preferably at a constant speed, and is then subjected to an extrusion molding. Meanwhile, the position and the feeding amount of the elongate shaped body 2 fed to the extrusion die assembly 26 are detected by a detecting device, such as a position sensor which serves to detect the varying position in the varying cross-section part 2a of the elongate shaped body 2. The detection signal from the detecting device is delivered to the control unit.

In the extrusion die assembly 26, the drive devices 40a, 40b are driven in response to drive signals from the control unit in accordance with the detection signal from the above-mentioned detecting device, so as to move the first and second movable dies 32a, 32b back and forth. On this occasion, the detecting device 25a detects the variation degree and the feeding amount of the varying cross-section part 2a. A control unit computes the times by which the relevant points of the varying cross-section part 2a reach the positions of the first and second movable dies 32a, 32b, based on the distances between the detecting device and the first and second movable dies, and also on the feed speed. According to the computed time, the control unit transmits drive signals for controlling the timings, the speeds and the amounts of the forward and backward movements of the first and second movable dies 32a, 32b. When the elongate shaped body 2 has an adequate rigidity, such as a profiled metal member, a cam action between a varying part of the varying cross-section part and the first movable die 32a due to the passage of the elongate shaped body 2 causes the first movable die 32a to move back and forth, and accordingly, the drive device 40a can be eliminated. The manner of such operation is the same as that explained above.

As mentioned above, while the first and second movable dies 32a and 32b are being moved back and forth, the elongate shaped body 2 is fed so that the common cross-section part 2b is allowed to pass through the passage 36b of the passage 36 in the holding member 37 and the varying cross-section part 2a is allowed to pass through the passage 36a, 36c of the extrusion die assembly 26, respectively, and the resin 19 is fed through the resin flow passage 33 to carry out the extrusion molding. On such occasion, the resin 19 is branched into the resin flow passages 34, 35 in the stationary die 31. The resin 19b flowing through the resin flow passage 35 is extruded from the orifice 38 so as to longitudinally and continuously form the resin part 4 in the common cross-section part 2b of the elongate shaped body 2.

Meanwhile, the resin 19a flowing through the passage 34 is fed through the orifice 34a in the stationary die 31 and received into the communication port 44 from which the resin flows through the resin flow-out passage 43 in the first movable die 32a, before it is extruded from the orifice 45. It is to be noted that the discharge end of the second movable die 32b is divided by the sharp blade-like cutter 48 so that a part serves to form the resin part 3 in the varying cross-section part 2a of the elongate shaped body 2 to thereby form the elongate composite member 1. The remaining part serves to discharge resin 19c through the resin discharge port 49. The discharged resin can be suitably processed and then reused.

At this time, the common cross-section part 2b of the elongate shaped body 2 passes through the passage 36 in the stationary die 31. Thus, the elongate shaped body 2 is prevented from moving in a direction intersecting the advancing direction thereof, and in a rotating direction about the longitudinal axis of the elongate shaped body 2, so that the common cross-section part 2b is advanced while always maintaining the same position and posture. In this case, while the widths X1 to X3 of the elongate shaped body 2 vary in association with the advancement of the elongate shaped body 2, the first movable die 32a is moved back and forth in the directions of the arrows P, Q by the drive device 40a in response to such variations. Thus, the fold-back part 14 formed at the tip end of the varying cross-section part 2a always passes through the passage 36c in the first movable die 32a. By this, the resin 3 is always formed at the tip end of the varying cross-section part 2a.

Meanwhile, the second movable die 32b is moved back and forth in the directions R, S on the first movable die 32a, by the drive device 40b in response to variations in the projecting widths Y1 to Y3 of the resin part 3, and the position of the cutter 48 varies accordingly. Thus, while the resin which is extruded from the orifice 45 with constant volume and constant shape, that part of the extruded resin which forms the resin part 3 has a volume which substantially varies so that the cross-sectional area of the resin part 3 varies. The resin part 3 is fixed to the varying cross-section part 2a with a cross-sectional shape which varies in the longitudinal direction. Thus, there is formed an elongate composite member 1 having its cross-sectional shape which varies in the longitudinal direction.

It is to be noted that, instead of using the cutter 48, the resin to be extruded may be blocked during the extrusion molding by the second movable die 32b, so that the cross-sectional shape of the resin part 3 can be changed. In this case, appropriate countermeasure is required, for example, to discharge the resin flow in the blocked part through another opening and thereby prevent fluctuation of the resin pressure within the extrusion die assembly 26, or to control the rotational speed of the feeding screw in the extruder so as to increase or decrease the flow rate of the resin fed into the extrusion die assembly 26.

As shown in FIG. 11, during the period when a part of the elongate shaped body 2 having the minimum width X2 passes through the first and second movable dies 32a, 32b, the first movable die 32a is advanced to the position indicated by the solid line, so as to form the center portion 1b. In a part where the elongate shaped body 2 is further advanced and the width X3 or X1 is increased, the movable dies 32a, 32 are retracted to form the rear portion 1c or the front portion 1a. When the width of the elongate shaped body 2 becomes the maximum width X4, the first and second movable dies 32a, 32b are retracted to positions indicated by the dotted lines 32c, 32d. At this position, the extrusion molding is carried out for a while, so as to form the gripping marginal part 1d. When the width of the elongate shaped body 2 is subsequently decreased to X1 or X3, the first and second movable dies 32a, 32b are advanced so as to form the front portion 1a or the rear portion 1c.

The second movable die 32b is gradually retracted so as to form the resin part 3 having the projecting width Y1 which is gradually increased. When, however, the rear portion 1c is formed, the retracted condition of the second movable die 32b is maintained so as to form the resin part 3 having a substantially constant projecting width Y3.

Referring to FIG. 10, the varying cross-section part 2a of the elongate shaped body 2 varies in an arcuate manner. The first movable die 32a is thus guided by the guide members 39a, 39a and moved along the arcuate path corresponding to the variation of the varying cross-section part 2a, and the drive device 40a is rotated about the pin 46 in response to such movement of the first movable die 32a. When, however, the varying cross-section part 2a varies in a linear manner, the first movable die 32a is linearly moved so that the drive device may be fixedly secured and prevented from rotation. This has already been explained hereinbefore.

FIGS. 13A, 13B and 13C are cross-sectional views similar to FIGS. 9A, 9B and 9C, illustrating a variant form of the elongate composite member shown in FIG. 8. According to this variant form, a convex shaped part 14a similar to that shown in FIGS. 7A, 7B and 7C is formed in the bright part 15 of the varying cross-section part 2a so that the distance from the common cross-section part 2b varies along the longitudinal direction.

Figure 14:
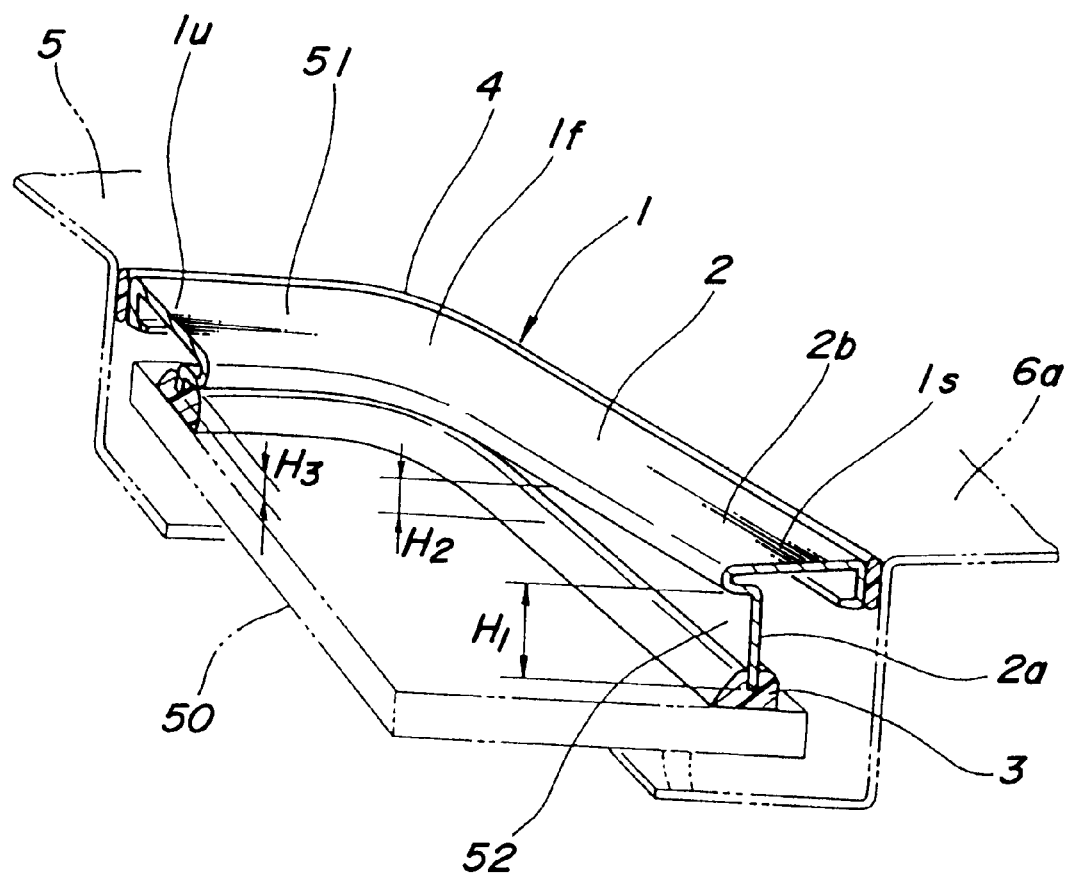
FIG. 14 is a perspective view illustrating an essential part of a vehicle front window molding member according to another embodiment of the elongate composite member of the present invention.

FIG. 14 is a perspective view illustrating a characteristic part (i.e., a part adjacent to the left corner) of a vehicle front window molding member according to another embodiment of the elongate composite member of the present invention. The elongate composite member 1 in this embodiment is attached to the peripheral edge of the front window plate 50, and is formed continuously, from an upper part 1u to a side part 1s via a corner part 1f. The elongate composite member 1 includes a leg 52 which is extended from a head 51 on the outer surface side toward a window plate 50. As measured from the window plate surface, the leg 52 has the maximum height H1 in the side part 1s, an intermediate height H2 at or near the corner portion 1f, and the minimum height H3 in the upper part 1u. In this elongate composite member, the part having the leg 52 corresponds to the varying cross-section part 2a of the elongate shaped body 2, and the part having the head corresponds to the common cross-section part 2b, and the resin parts 3, 4 are fixed to these cross-section parts, respectively. Such a window molding member is disclosed, for example, in Japanese Utility Model Unexamined Publication No. 2-63,217. The elongate composite member 1 according to this embodiment can also be easily manufactured by the facility shown in FIGS. 3 to 5, and by a method similar to the method explained above.

While the present invention has been explained above with reference to certain preferred embodiments shown in the accompanying drawings, these embodiments were presented by way of examples only, without in anyway limiting the present invention. It is of course that the present invention can be practiced in various modes within the scope thereof. For example, the shape, structure and materials of the elongate composite members can be changed as appropriate, and those of the elongate shaped body and the resin part can also be changed. Furthermore, the method of varying the cross-sectional shapes can also be changed.

What is claimed is:

1. An elongate composite member having a cross-sectional shape which varies in a longitudinal direction thereof, comprising:

an elongate shaped body having a common cross-section part with a cross-sectional shape having a width which is substantially constant in the longitudinal direction, and a varying cross-section part with a cross-sectional shape having a width which varies in the longitudinal direction; and a resin part extruded along said elongate shaped body and having a predetermined sectional shape, said resin part extending along the elongate composite member in the longitudinal direction corresponding to variation in the varying cross-section part of the elongate shaped body.

2. The elongate composite member according to claim 1, wherein said elongate shaped body is formed of a profiled metal member.

3. The elongate composite member according to claim 2, wherein said profiled metal member comprises a roll-formed metal strip.

4. The elongate composite member according to claim 2, wherein said profiled metal member comprises an extruded metal.

5. The elongate composite member according to claim 1, wherein said resin part has a cross-sectional shape along the varying cross-section part of the elongate shaped body, which varies in the longitudinal direction.

6. A method of manufacturing elongate composite members having a cross-sectional shape which varies in a longitudinal direction thereof, comprising the steps of:

continuously feeding an elongate shaped body having a common cross-section part with a cross-sectional shape having a width which is substantially constant in the longitudinal direction, and a varying cross-section part with a cross-sectional shape having a width which varies in the longitudinal direction, in its longitudinal direction into an extrusion die assembly comprising a stationary die and a first movable die which is movable relative to the stationary die, so that the elongate shaped body is longitudinally passed through the extrusion die assembly, with the stationary die and the first movable die corresponding to the common cross-section part and the varying cross-section part of the elongate shaped body, respectively; and extruding resin from an extrusion orifice formed in the first movable die while moving the first movable die in a direction intersecting a passing direction of the elongate shaped body, in association with the longitudinal passing of the varying cross-section part of the elongate shaped body, so as to form a resin part in the varying cross-section part, which continuously extends along the elongate composite member in the longitudinal direction corresponding to variation of the varying cross-section part, thereby forming the elongate composite member.

7. The method according to claim 6, wherein the elongate shaped body has been formed by bending a metal strip into a profiled cross-sectional shape by a roll-forming process.

8. The method according to claim 6, wherein the continuous elongate shaped body is fed into the extrusion die assembly so as to form the resin part, and is subsequently cut at a predetermined position.

9. The method according to claim 6, wherein elongate shaped bodies cut into a predetermined length are successively fed into the extrusion die assembly.

10. The method according to claim 6, wherein the elongate shaped body comprises an extruded metal which has been cut into a predetermined length.

11. The method according to claim 6, wherein the resin is extruded from a resin extrusion orifice formed in the stationary die so as to form a further resin part which is continuous in the longitudinal direction also in the common cross-section part.

12. The method according to claim 6, wherein the cross-sectional shape of the elongate shaped body is changed after the resin part has been formed.

13. The method according to claim 6, wherein the extrusion die assembly further comprises a second movable die which is movable relative to the first movable die, and the second movable die is moved relative to the first movable die when the resin is extruded from the extrusion orifice in the first movable die, so as to change an extruded shape of the resin extruded from the first movable die so that the cross-sectional shape of the resin part in the varying cross-section part of the elongate shaped body changes in the longitudinal direction.

14. An apparatus for manufacturing elongate composite members having a cross-sectional shape which varies in a longitudinal direction thereof, comprising:

extrusion die assembly into which an elongate shaped body having a common cross-section part with a cross-sectional shape having a width which varies in a longitudinal direction thereof, and a varying cross-section part with a cross-sectional shape having a width which varies in the longitudinal direction, is continuously fed in the longitudinal direction so that the elongate shaped body is formed with a resin part which extends in the longitudinal direction;

said extrusion die assembly comprising a stationary die allowing a passage of the common cross-section part of the elongate shaped body, and a first movable die allowing a passage of the varying cross-section part of the elongate shaped body and having a resin extrusion orifice;

said movable die being movable in a direction which intersects a passing direction of the varying cross-section part of the elongate shaped body and in which the varying cross-section part varies, in response to the passage of the elongate shaped body, while extruding a resin from said extrusion orifice so as to form the resin part along the varying cross-section part corresponding to variation thereof, thereby to manufacture the elongate composite member.

15. The apparatus according to claim 14, wherein the movable die is moved by an amount which is controlled in accordance with a passage length of the elongate shaped body.

16. The apparatus according to claim 14, further comprising a roll forming machine for bending a metal strip to form the elongate shaped body, said roll forming machine being arranged on an upstream of the extrusion die assembly.

17. The apparatus according to claim 16, further comprising a slitter which is arranged downstream of said roll forming machine, so that the metal strip is subjected to a slitting process by the slitter continuously in the longitudinal direction for partly removing a widthwise part of the metal strip and thereby changing the width of the metal strip.

18. The apparatus according to claim 14, wherein said extrusion die assembly further comprises a second movable die which is movable relative to the first movable die, said second movable die being moved relative to the first movable die when the resin is extruded from the extrusion orifice in the first movable die, so as to change an extruded shape of the resin extruded from the first movable die and thereby change the cross-sectional shape of the resin part.

* * * * *